US008332277B2

(12) United States Patent (10) Patent No.: US 8,332,277 B2
McCaffery et al. (45) Date of Patent: Dec. 11, 2012

(54) METHOD, SYSTEM AND COMPUTER READABLE MEDIUM FOR FACILITATING A TRANSACTION BETWEEN A CUSTOMER, A MERCHANT AND AN ASSOCIATE

(75) Inventors: Michael McCaffery, Hoboken, NJ (US); Mark Bunger, San Francisco, CA (US); Michael Reiling, Dublin, CA (US); Michael Comb, Dublin, CA (US); Edward Bank, San Mateo, CA (US); Carolee A. Reiling, Redwood City, CA (US); Juan Carlos Velten, San Francisco, CA (US)

(73) Assignee: You Technology Brand Services, Inc., Delray Beach, FL (US)

( * ) Notice: Subject to any disclaimer, the term of this patent is extended or adjusted under 35 U.S.C. 154(b) by 31 days.

(21) Appl. No.: 12/406,527

(22) Filed: Mar. 18, 2009

(65) Prior Publication Data

US 2009/0228341 A1 Sep. 10, 2009

Related U.S. Application Data

(63) Continuation of application No. 09/822,961, filed on Mar. 30, 2001.

(60) Provisional application No. 60/193,880, filed on Mar. 31, 2000.

(51) Int. Cl.
*G06Q 30/00* (2006.01)
(52) U.S. Cl. ............... 705/26.1; 705/34; 705/37; 705/7; 705/10; 705/27; 705/30; 705/35; 705/16; 705/39; 705/40; 235/487; 235/454; 235/375; 235/380
(58) Field of Classification Search ...................... 705/26
See application file for complete search history.

(56) References Cited

U.S. PATENT DOCUMENTS 4,669,730 A 6/1987 Small
(Continued)

FOREIGN PATENT DOCUMENTS

EP 0889421 A1 1/1999
(Continued)

OTHER PUBLICATIONS

First USA, CyberMark to Issue First Publicly-Available U.S. Dual-Function Credit/Smart Card for Florida State University. Business Editors. Business Wire. New York: Sep 17, 1998. p. 1.*

(Continued)

*Primary Examiner* — F. Zeender
*Assistant Examiner* — Fawaad Haider
(74) *Attorney, Agent, or Firm* — Pepper Hamilton LLP

(57) ABSTRACT

A method and system for facilitating a transaction between at least one user, at least one merchant, at least one associate is provided. The method includes the steps of the associate processing device transferring into the user processing device a first merchant link for a first merchant Web site on a first merchant processing device. The first merchant link is framed with associate information. The user selects the first merchant link. The associate processing device transfers into the user processing device information regarding a first product from the first merchant Web site. The user selects the first product to purchase. The user provides purchase information for purchasing the first product. The user processing device transfers the purchase information to the associate processing device. The associate processing device adds promotional information to the purchase information responsive to the user identification value. The associate processing device transfers the promotional information and the purchase information to the merchant processing device.

20 Claims, 10 Drawing Sheets

U.S. PATENT DOCUMENTS

| | | | |
|---|---|---|---|
| 4,815,741 A | 3/1989 | Small | |
| 4,982,346 A | 1/1991 | Girouard et al. | |
| 5,056,019 A | 10/1991 | Schultz et al. | |
| 5,149,202 A | 9/1992 | Dickert | |
| 5,231,568 A | 7/1993 | Cohen et al. | |
| 5,249,044 A | 9/1993 | Von Kohorn | |
| 5,282,534 A | 2/1994 | Lapp | |
| 5,373,440 A | 12/1994 | Cohen et al. | |
| 5,431,274 A | 7/1995 | Schaupp | |
| 5,530,455 A | 6/1996 | Gillick et al. | |
| 5,590,197 A | 12/1996 | Chen et al. | |
| 5,592,378 A | 1/1997 | Cameron et al. | |
| 5,613,680 A | 3/1997 | Groves et al. | |
| 5,710,886 A | 1/1998 | Christensen et al. | |
| 5,715,400 A | 2/1998 | Reimer et al. | |
| 5,717,923 A | 2/1998 | Dedrick | |
| 5,729,693 A | 3/1998 | Holda-Fleck | |
| 5,759,101 A | 6/1998 | Von Kohorn | |
| 5,774,670 A | 6/1998 | Montulli | |
| 5,774,868 A | 6/1998 | Cragun et al. | |
| 5,774,870 A | 6/1998 | Storey | |
| 5,791,991 A | 8/1998 | Small | |
| 5,794,259 A | 8/1998 | Kikinis | |
| 5,806,043 A | 9/1998 | Toader | |
| 5,809,481 A | 9/1998 | Baron et al. | |
| 5,826,242 A | 10/1998 | Montulli | |
| 5,832,457 A | 11/1998 | O'Brien et al. | |
| 5,832,459 A | 11/1998 | Cameron et al. | |
| 5,848,396 A | 12/1998 | Gerace | |
| 5,852,717 A | 12/1998 | Bhide et al. | |
| 5,883,620 A | 3/1999 | Hobbs et al. | |
| 5,892,827 A | 4/1999 | Beach et al. | |
| 5,893,075 A | 4/1999 | Plainfield et al. | |
| 5,899,980 A | 5/1999 | Wilf et al. | |
| 5,907,830 A | 5/1999 | Engel et al. | |
| 5,913,210 A | 6/1999 | Call | |
| 5,916,024 A | 6/1999 | Von Kohorn | |
| 5,918,211 A | 6/1999 | Sloane | |
| 5,935,207 A | 8/1999 | Logue et al. | |
| 5,940,807 A | 8/1999 | Purcell | |
| 5,960,411 A | 9/1999 | Hartman et al. | |
| 5,966,697 A | 10/1999 | Fergerson et al. | |
| 5,970,469 A | 10/1999 | Scroggie et al. | |
| 5,970,472 A | 10/1999 | Allsop et al. | |
| 5,970,474 A | 10/1999 | LeRoy et al. | |
| 5,978,840 A | 11/1999 | Nguyen et al. | |
| 5,983,196 A | 11/1999 | Wendkos | |
| 5,983,227 A | 11/1999 | Nazem et al. | |
| 5,991,736 A * | 11/1999 | Ferguson et al. | 705/14.18 |
| 5,991,740 A | 11/1999 | Messer | |
| 5,991,756 A | 11/1999 | Wu | |
| 6,009,410 A | 12/1999 | LeMole et al. | |
| 6,014,634 A | 1/2000 | Scroggie et al. | |
| 6,016,484 A | 1/2000 | Williams et al. | |
| 6,016,504 A | 1/2000 | Arnold et al. | |
| 6,020,887 A | 2/2000 | Loring et al. | |
| 6,021,426 A | 2/2000 | Douglis et al. | |
| 6,026,370 A | 2/2000 | Jermyn | |
| 6,029,141 A | 2/2000 | Bezos et al. | |
| 6,035,280 A | 3/2000 | Christensen | |
| 6,039,244 A | 3/2000 | Finsterwald | |
| 6,055,573 A | 4/2000 | Gardenswartz et al. | |
| 6,058,373 A | 5/2000 | Blinn et al. | |
| 6,061,660 A | 5/2000 | Eggleston et al. | |
| 6,064,979 A | 5/2000 | Perkowski | |
| 6,101,482 A | 8/2000 | DiAngelo et al. | |
| 6,105,008 A | 8/2000 | Davis et al. | |
| 6,128,655 A | 10/2000 | Fields et al. | |
| 6,141,666 A | 10/2000 | Tobin | |
| 6,173,267 B1 | 1/2001 | Cairns | |
| 6,175,823 B1 | 1/2001 | Van Dusen | |
| 6,185,625 B1 | 2/2001 | Tso et al. | |
| 6,192,380 B1 | 2/2001 | Light et al. | |
| 6,199,079 B1 | 3/2001 | Gupta et al. | |
| 6,205,469 B1 | 3/2001 | Graham | |
| 6,216,129 B1 | 4/2001 | Eldering | |
| 6,216,157 B1 | 4/2001 | Vishwanath et al. | |
| 6,236,975 B1 * | 5/2001 | Boe et al. | 705/7.32 |
| 6,240,397 B1 | 5/2001 | Sachs | |
| 6,251,017 B1 | 6/2001 | Leason et al. | |
| 6,256,614 B1 | 7/2001 | Wecker et al. | |
| 6,266,649 B1 | 7/2001 | Linden et al. | |
| 6,266,653 B1 | 7/2001 | Shiobara et al. | |
| 6,266,681 B1 | 7/2001 | Guthrie | |
| 6,266,684 B1 | 7/2001 | Kraus et al. | |
| 6,272,472 B1 | 8/2001 | Danneels et al. | |
| 6,282,522 B1 | 8/2001 | Davis et al. | |
| 6,297,819 B1 | 10/2001 | Furst | |
| 6,298,348 B1 | 10/2001 | Eldering | |
| 6,298,356 B1 | 10/2001 | Jawahar et al. | |
| 6,308,887 B1 | 10/2001 | Korman et al. | |
| 6,318,536 B1 | 11/2001 | Korman et al. | |
| 6,324,522 B2 | 11/2001 | Peterson et al. | |
| 6,327,574 B1 | 12/2001 | Kramer et al. | |
| 6,341,353 B1 | 1/2002 | Herman et al. | |
| 6,345,261 B1 | 2/2002 | Feidelson et al. | |
| 6,370,514 B1 | 4/2002 | Messner | |
| 6,401,077 B1 | 6/2002 | Godden et al. | |
| 6,405,174 B1 | 6/2002 | Walker et al. | |
| 6,421,693 B1 | 7/2002 | Nishiyama et al. | |
| 6,473,738 B1 | 10/2002 | Garrett | |
| 6,490,602 B1 | 12/2002 | Kraemer | |
| 6,516,302 B1 * | 2/2003 | Deaton et al. | 705/14.38 |
| 6,578,011 B1 | 6/2003 | Forward | |
| 6,587,835 B1 | 7/2003 | Treyz et al. | |
| 6,593,944 B1 | 7/2003 | Nicolas et al. | |
| 6,594,640 B1 | 7/2003 | Postrel | |
| 6,594,644 B1 | 7/2003 | Van Dusen | |
| 6,611,814 B1 | 8/2003 | Lee et al. | |
| 6,618,705 B1 | 9/2003 | Wang et al. | |
| 6,629,135 B1 | 9/2003 | Ross, Jr. et al. | |
| 6,662,340 B2 | 12/2003 | Rawat et al. | |
| 6,662,341 B1 | 12/2003 | Cooper et al. | |
| 6,701,368 B1 | 3/2004 | Chennapragada et al. | |
| 6,735,572 B2 | 5/2004 | Landesmann | |
| 6,782,369 B1 | 8/2004 | Carrott | |
| 6,805,289 B2 | 10/2004 | Noriega et al. | |
| 6,836,799 B1 | 12/2004 | Philyaw et al. | |
| 6,839,683 B1 | 1/2005 | Walker et al. | |
| 6,847,969 B1 | 1/2005 | Mathai et al. | |
| 6,857,124 B1 | 2/2005 | Doyle | |
| 6,868,392 B1 | 3/2005 | Ogasawara | |
| 6,873,974 B1 | 3/2005 | Schutzer | |
| 6,885,994 B1 | 4/2005 | Scroggie et al. | |
| 6,886,000 B1 | 4/2005 | Aggarwal et al. | |
| 6,901,378 B1 | 5/2005 | Linker et al. | |
| 6,920,611 B1 | 7/2005 | Spaeth et al. | |
| 6,934,690 B1 | 8/2005 | Van Horn et al. | |
| 6,934,743 B2 | 8/2005 | Huat | |
| 6,938,073 B1 | 8/2005 | Mendhekar et al. | |
| 6,980,962 B1 | 12/2005 | Arganbright et al. | |
| 6,986,030 B2 | 1/2006 | Shmueli et al. | |
| 7,013,289 B2 | 3/2006 | Horn et al. | |
| 7,020,625 B2 | 3/2006 | Tiley et al. | |
| 7,028,072 B1 | 4/2006 | Kliger et al. | |
| 7,424,617 B2 | 9/2008 | Boyd et al. | |
| 7,801,766 B2 | 9/2010 | Bunger et al. | |
| 2002/0174018 A1 | 11/2002 | Bunger et al. | |
| 2004/0078273 A1 * | 4/2004 | Loeb et al. | 705/26 |

FOREIGN PATENT DOCUMENTS

| | | |
|---|---|---|
| EP | 0918295 A2 | 5/1999 |
| WO | WO 94/15301 A1 | 7/1994 |
| WO | WO 98/57276 A1 | 12/1998 |
| WO | WO 99/23581 A1 | 5/1999 |
| WO | WO 99/41694 A1 | 8/1999 |
| WO | WO 99/66496 A1 | 12/1999 |
| WO | WO 99/66673 A1 | 12/1999 |
| WO | WO 00/25239 A1 | 5/2000 |
| WO | WO 00/42531 A2 | 7/2000 |
| WO | WO 00/67149 A2 | 11/2000 |
| WO | WO 00/68823 A2 | 11/2000 |
| WO | WO 00/73934 A2 | 12/2000 |
| WO | WO 01/04802 A1 | 1/2001 |
| WO | WO 01/11485 A2 | 2/2001 |
| WO | WO 01/29750 A1 | 4/2001 |

OTHER PUBLICATIONS

Stokell, RocketCash Targets Teens with Secure E-Commerce, Newsbytes PM, Jun. 1, 1999.

RocketCash™ Gives Teens Complete E-Commerce Freedom, Allows Kids to Open Free Online Spending Accounts Without Parent Credit Cards, PR Newswire, Oct. 5, 1999.

RocketCash and Cybergold Empower Teens to Earn Money and Shop Online, PR Newswire, Mar. 7, 2000.

LEC LTD Introduces Internet Concept Called E-stakes; New Promotional Concept Provides First-Ever Direct Link Between the Web and Packaged Goods in an In-Store Environment, Business Wire; New York; Mar. 18, 1998.

White, How Computers Work, Millennium Ed., Que Corporation, Indianapolis, IN, Sep. 22, 1999 (TOC).

Derfler et al., How Networks Work, Millennium Ed., Que Corporation, Indianapolis, IN, Aug. 23, 2000 (TOC).

Gralla, How the Internet Works, Millennium Ed., Que Corporation, Indianapolis, IN, Sep. 23, 1999 (TOC).

Muller, Desktop Encyclopedia of the Internet, Artech House, Inc., Boston, MA, 1998 (TOC).

Bragg, Accounting Best Practices, John Wiley and Sons, Inc., New York, USA, 1999 (TOC).

Keyes, Handbook of Technology in Financial Services 1999, CRC Press, LLC, Boca Raton, FL, 1999 (TOC).

Gavron et al., How to Use Microsoft Windows NT 4 Workstation, MacMillan Computer Publishing, California, USA, 1996 (TOC).

Non-Final Office Action, United States Patent & Trademark Office, U.S. Appl. No. 10/964,164, filed Oct. 13, 2004, Aug. 4, 2008.

Non-Final Office Action, United States Patent & Trademark Office, U.S. Appl. No. 11/226,629, filed Sep. 14, 2005, Aug. 5, 2008.

Final Office Action, United States Patent & Trademark Office, U.S. Appl. No. 10/071,562, filed Feb. 8, 2002, Oct. 18, 2007.

Soat, Small Companies Say They're Being Sued for Employing Common Practices for Doing Business on the Net, www.informationweek.com, Oct. 21, 2002.

Danish et al., Building Database-Driven Web Catalogs, McGraw-Hill Companies, Inc., New York, New York, 1998 (TOC).

Derfler Jr. et al., How Networks Work, Millennium Ed., Que Corporation, Indianapolis, IN, Sep. 2000 (TOC).

Gralla, How the Internet Works, Millennium Ed., Que Corporation, Indianapolis, IN, Aug. 1999 (TOC).

Muller, Desktop Encyclopedia of the Internet, Artech House, Inc., Boston, MA, 1999 (TOC).

Avery, Purchasing Takes Cards to New Level. (Corporate Purchasing Cards) (White Paper Report), Feb. 15, 1996, Purchasing, 120(2):54(6).

* cited by examiner

| SC# | Promotion Name | Existing Balance | Expiration Date | Online Merchants for Shopping |
|---|---|---|---|---|
| XXXX | Levi's | $15.00 | 12/31/1999 | Amazon.com, Cdnow.com (showing their icons) |
| YYYY | Kellogs | $7.55 | 01/23/2000 | etoys.com, games2learn.com (showing their icons) |
| | | | | click on an icon to go shopping! |

Fig. 5

METHOD, SYSTEM AND COMPUTER READABLE MEDIUM FOR FACILITATING A TRANSACTION BETWEEN A CUSTOMER, A MERCHANT AND AN ASSOCIATE

CROSS REFERENCE TO RELATED APPLICATIONS

This application is a continuation of and claims priority to co-pending U.S. patent application Ser. No. 09/822,961 filed Mar. 30, 2001, which claims priority to U.S. Patent Application 60/193,880 filed Mar. 31, 2000.

FIELD OF THE INVENTION

This invention relates generally to presentation of Web pages in a computer network. In particular, the invention relates to an improved method for presenting a Web page in a Web browser for facilitating a transaction.

BACKGROUND

The World Wide Web ("Web") is the Internet's multimedia information retrieval system. It is the most commonly used method of transferring data in the Internet environment. Client processing device accomplish transactions to Web servers using the Hypertext Transfer Protocol ("HTTP"), which is a known application protocol providing users access to files, e.g., text, graphics, images, sound, video, using a standard page description language known as the Hypertext Markup Language ("HTML"). HTML provides basic document formatting and allows the developer to specify "links" to other servers and files. In the Internet paradigm, a Uniform Resource Locator ("URL") having a specific syntax identifies a network path to a server for defining a network connection. Embedded hypertext links on a given Web page can be used to find information related to the given Web page. By clicking on a hypertext link in one Web page, the user can display another related Web page or even invoke a related program.

Retrieval of information is generally achieved by the use of an HTML-compatible "browser", e.g., Netscape Navigator, at a client processing device. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

Graphical user interfaces that provide multiple views of related information (such as frames, panes, or windows) are becoming increasingly prevalent in commercially available products. Netscape Navigator's default behavior is to follow a link by replacing the current browser context. The Web page author can change this default behavior on a link-by-link basis. For example, HTML-based frames can be created and targeted programmatically by writing HTML or Javascript code.

An example involves browsing the set of results returned by a search engine. Users typically want to explore several promising sites listed in the page of search results. The typical interaction is to follow a link, look at the page, and then hit the back button to redisplay the search results. The user often wants to use the page of search results as a persistent launcher that opens the links in another specified view. In fact, this approach is so compelling that it is often hard coded into sites that use multiple frames.

Many Web servers have been developed through which merchants can advertise and sell products. The products can include items (e.g., music) that are delivered electronically to the purchaser over the Internet and items (e.g., books) that are delivered through conventional distribution channels (e.g., a common carrier). This usually consists of product information in catalog form stored in a computer memory, or server, assigned to the merchant. This set of information is referred to as the merchant's Web site, and may also include instructions on how the customer may order products from the merchant either through the Web access or by other means. A user, who is a potential purchaser, may browse through the catalog using a browser and select various products that are to be purchased. When the user has completed selecting the products to be purchased, the merchant server then prompts the user for information to complete the ordering of the products. This purchaser-specific order information may include the purchaser's name, the purchaser's credit card number, and a shipping address for the order. The server computer system then typically confirms the order by sending a confirming Web page to the client computer system and schedules shipment of the items. U.S. Pat. No. 5,960,411 issued to Hartman, et al. describes a system for placing an order to purchase an item via the Internet using an assigned client-specific identifier.

U.S. Pat. No. 6,029,141 to Bezos et al., describes an Internet-based referral system that enables individuals and other business entities ("associates") to market products that are sold from a merchant's Web site. This system requires the associate to set up a Web site to distribute hypertextual catalog documents that includes marketing information about selected products of the merchant. A hypertextual "referral link" is associated with each product that allows a user ("customer") to link to the merchant's site and purchase the product. When a customer selects a referral link, the customer's computer transmits unique IDs of the selected product and of the associate to the merchant's site, allowing the merchant to identify the product and the referring associate.

While this system allows marketing of a small number of associates—merchant relationships, the process of having each merchant set up a dedicated Web site for every associate it (the merchant) wishes to market its product through can be very time-consuming for the merchant. In addition, associates are burdened with having to deal with different, and often unknown, ways different merchants may have chosen to implement their individual Web site. This may cause the associate to maintain separate adapter systems for each merchant it decides to promote.

SUMMARY OF THE INVENTION

A method for facilitating a transaction between at least one user, at least one merchant, and at least one associate is provided. The method includes the steps of transferring from a user processing device to an associate processing device a user identification value. A user then inputs into a user processing device an address for an associate Web site on an associate processing device. The associate processing device transfers into the user processing device a first merchant link for a first merchant Web site on a first merchant processing device. The user selects the first merchant link. The associate processing device transfers into the user processing device information regarding a first product from the first merchant Web site. The user selects the first product to purchase. The user provides purchase information for purchasing the first product. The user processing device transfers the purchase information to the associate processing device. The associate processing device adds promotional information to the purchase information responsive to the user identification value. The associate processing device transfers the promotional information and the purchase information to the merchant processing device.

According to another embodiment of the present invention, the associate processing device is a proxy server.

According to another embodiment of the present invention, information regarding the first product from the first merchant Web site is framed with associate information.

According to another embodiment of the present invention, the promotional information includes a key value associated with the first merchant.

According to another embodiment of the present invention, the user identification value is a SoftCoin™ card number.

According to another embodiment of the present invention, the step of transferring the first merchant link for the first merchant Web site includes transferring a second merchant link for a second merchant Web site.

According to another embodiment of the present invention, the method further comprises the steps of obtaining by a user a card having a user identification value and a pass code value. The user processing device transfers the pass code value to the associate processing device.

According to another embodiment of the present invention, the method further comprises the steps of providing a list of merchant links responsive to the user identification value and pass code value.

According to another embodiment of the present invention, the associate processing device includes a database having a relation between the promotional information and the user identification value.

According to another embodiment of the present invention, the promotional information includes a plurality of key values associated with the first merchant.

According to another embodiment of the present invention, the promotional information and the purchase information is a payment page with redacted promotional information.

According to another embodiment of the present invention, the associate processing device calculates a breakage value.

According to another embodiment of the present invention, the user processing device, associate processing device, and merchant processing device are coupled the Internet.

According to another embodiment of the present invention, the user processing device includes a Web browser.

According to another embodiment of present invention, a computer for facilitating a transaction between at least one user and at least one merchant is provided. The computer comprises a processor coupled to a storage device. The processor operates with a program which receives a user identification value and provides a merchant link for a merchant Web site. The processor also operates with the program to provide product information from the merchant Web site and receives purchase information for the product. Promotional information is added to purchase information responsive to the user identification number. The promotional information and the purchase information are then provided to the merchant Web site.

According to another embodiment of the present invention, the storage device stores a database containing the user identification value and the promotional information. The storage device also stores user account information.

According to another embodiment of the present invention, a system facilitates a transaction between at least one user, at least one merchant and at least one associate. The system comprises a user computer for providing a user identification value and selecting a product from a plurality of products. An associate computer is coupled to the user computer. The associate computer stores promotional information for the user identification value and framing information. A merchant computer is coupled to the associate computer. The merchant computer provides the plurality of products and a purchase form. The user computer selects the product and provides purchase information for the purchase form. The associate computer provides promotional information for the purchase form responsive to the user identification value before transferring a redacted purchase form to the merchant computer.

According to another embodiment of the present invention, an article of manufacture, including a computer readable medium, is provided. The article of manufacture comprises a software program for receiving a user identification value. A software program provides a merchant Web site responsive to the user identification value. The software program receives purchase information for a product displayed at the merchant's Web page. A software program adds promotional information, responsive to the user identification value, to the purchase information and transfers the promotional information and purchase information to the merchant Web site.

Other aspects and advantages of the present invention can be seen upon review of the figures, the detailed description, and the claims which follow.

BRIEF DESCRIPTION OF THE FIGURES

FIG. 5 illustrates a table provided to a user according to an embodiment of the present invention.

DETAILED DESCRIPTION

I. System Overview

Figure 1A:
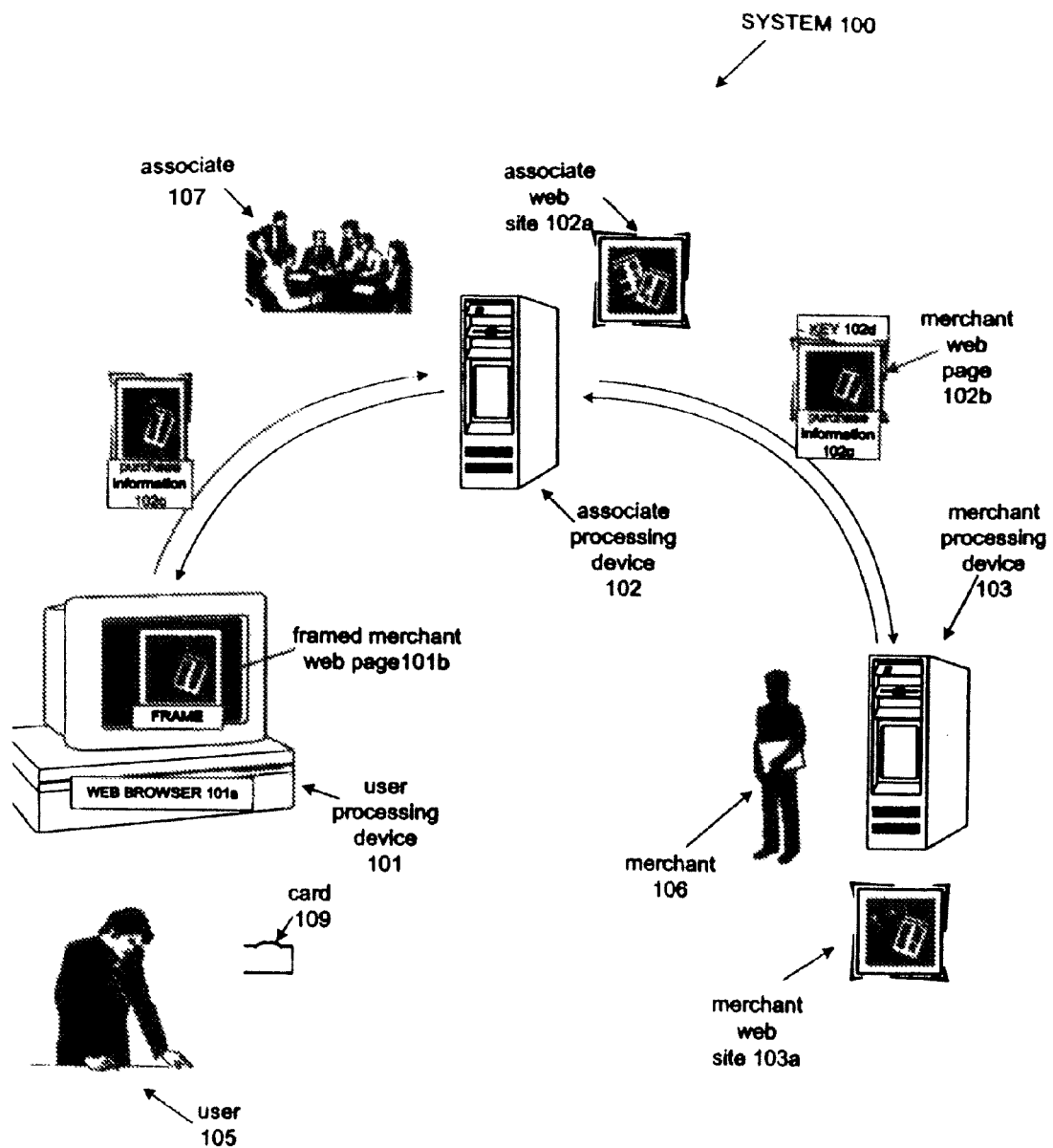
FIGS. 1(a)-(b) illustrates a system according to an embodiment of the present invention.
Figure 1B:
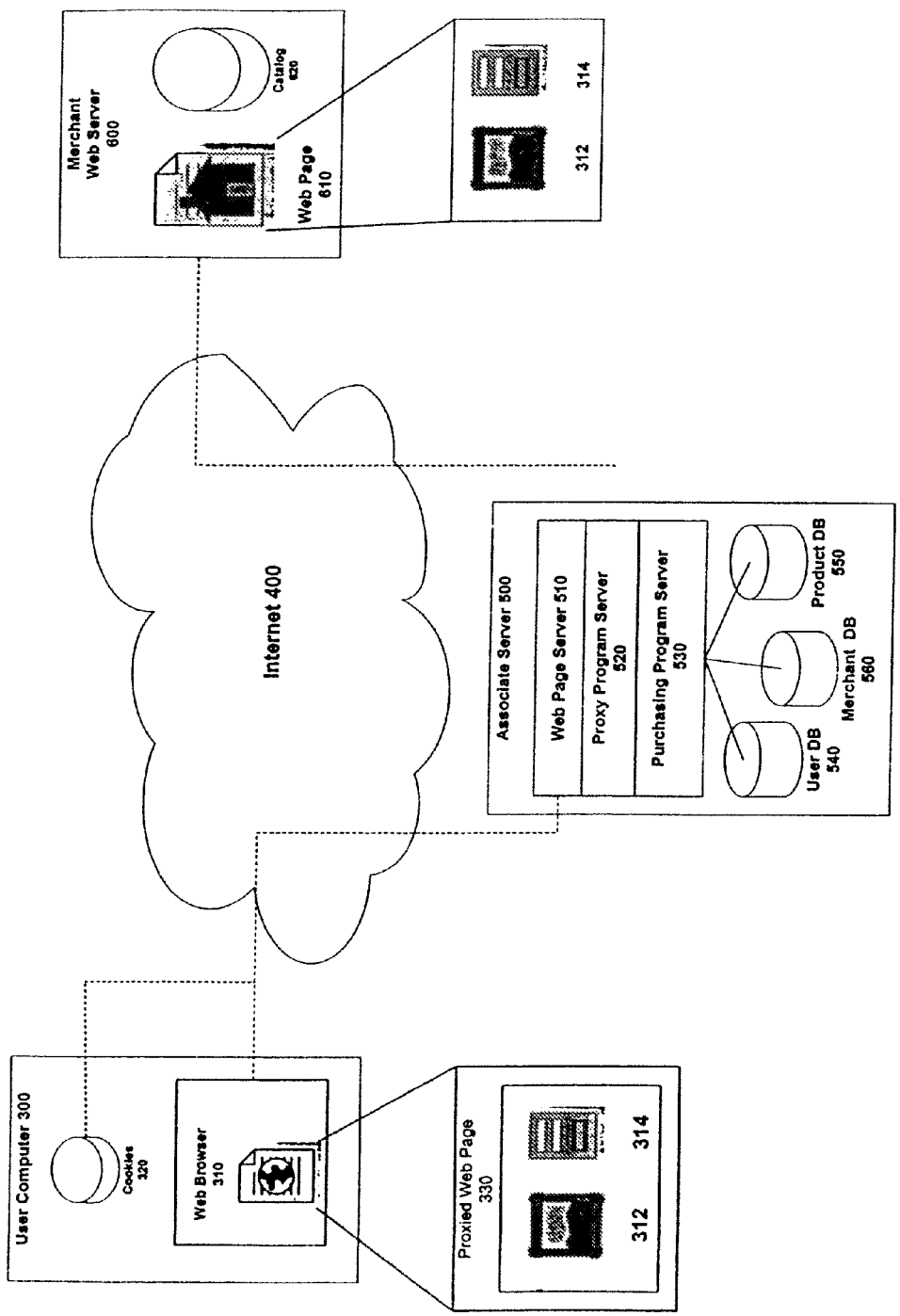
Figure 1C:
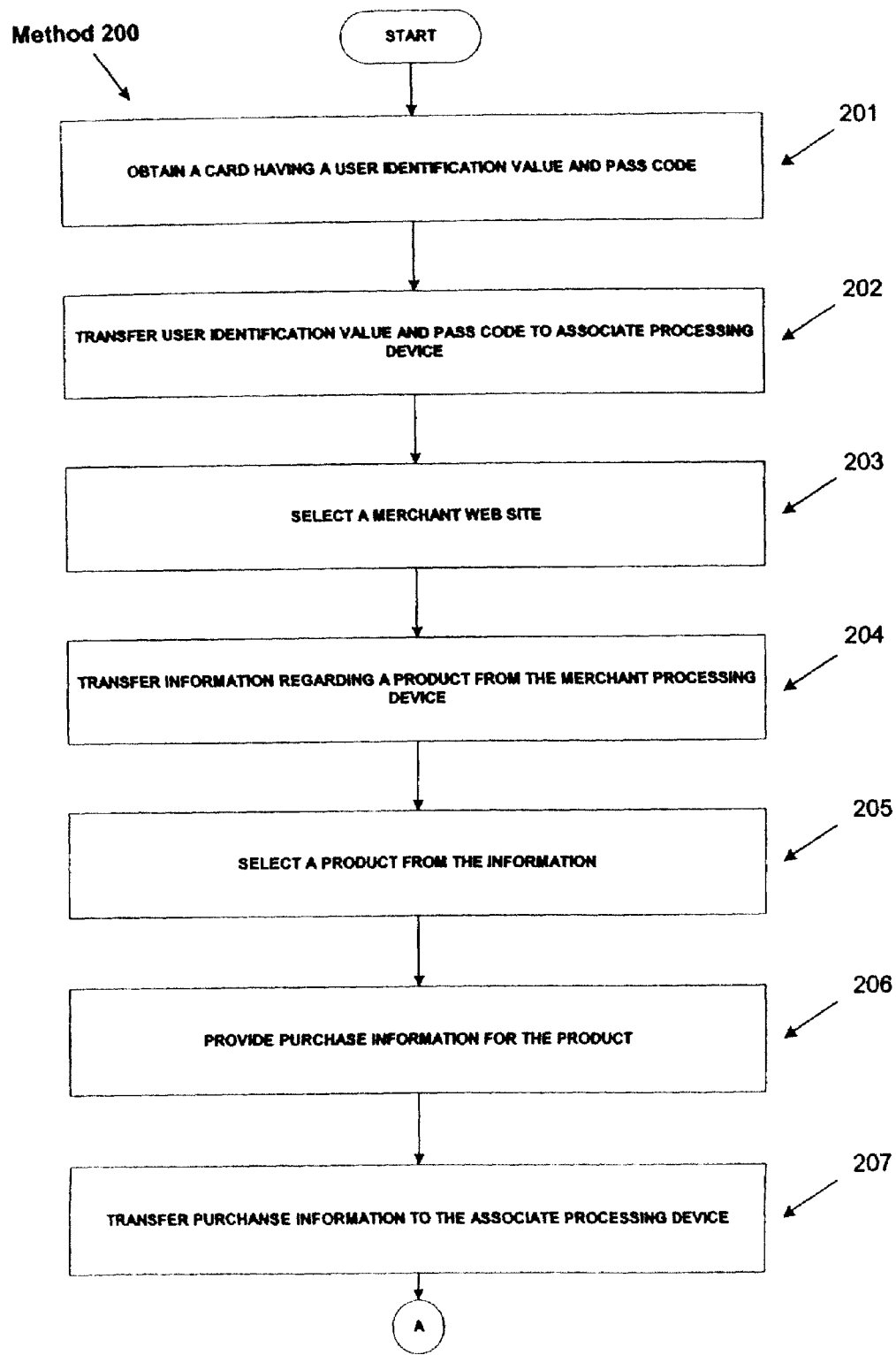
FIGS. 1(c)-(d) are a control flow diagram of a user purchasing a product from a merchant Web site using an associate Web site according to an embodiment of the present invention.
Figure 1D:
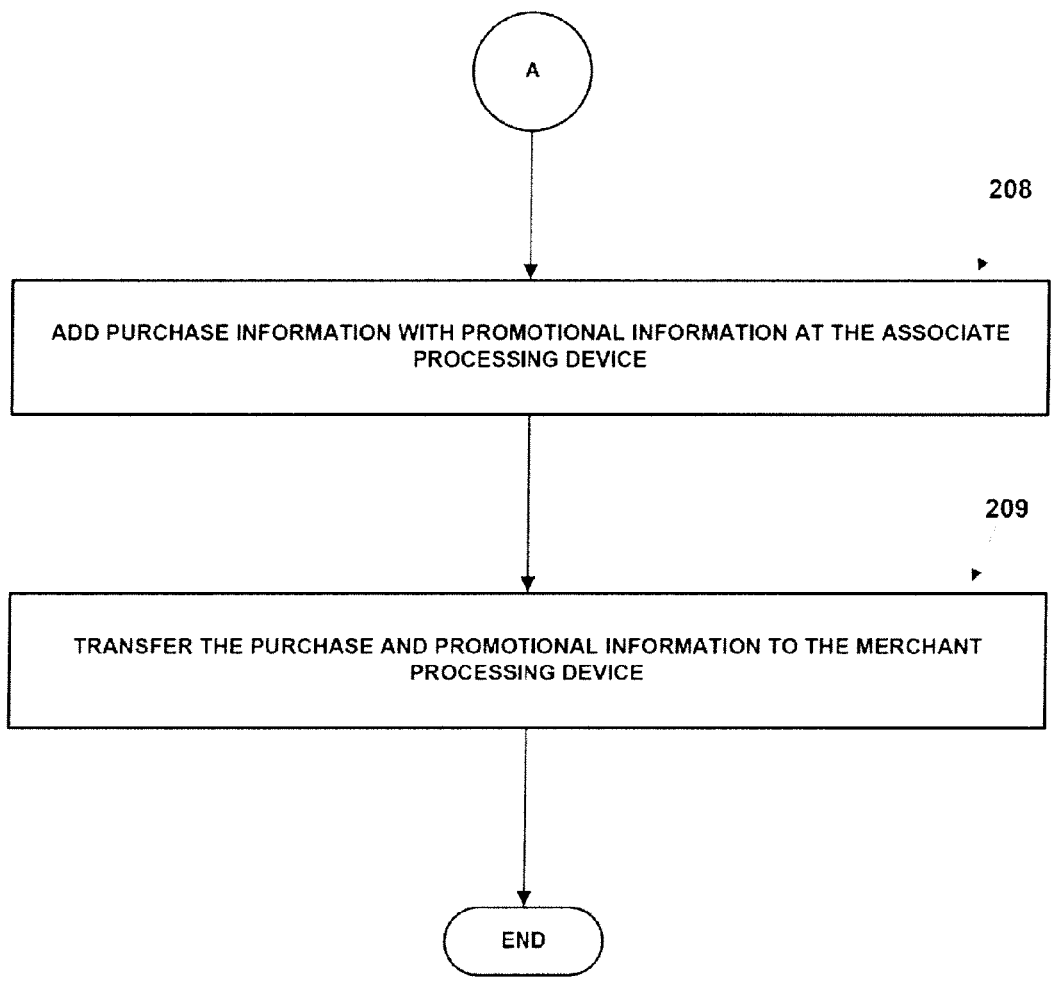

The following description and claims relate to a system that allows an associate to provide connectivity to merchant sites through back-end connections involving frames.

FIG. 1 illustrates a system 100 including a user processing device 101, associate processing device 102 and a merchant processing device 103 according to an embodiment of the present invention. User processing device 101 includes user Web browser 101a in an embodiment of the present invention. Associate processing device 102 includes associate Web site 102a (for example, "SoftCoin.com") and merchant processing device 103 includes merchant Web site 103a ("Online Merchant.com") according to an embodiment of the present invention. In an alternate embodiment of the present invention, merchant Web site 103a is located on associate processing device 102. In an embodiment of the present invention, processing devices shown in FIG. 1(*a*) are, singly or in combination, a main frame computer, desktop computer, handheld computer, a personal digital assistant, telephone, pager, information appliance, or an equivalent thereof.

System 100 allows an associate processing device 102 to present "framed" merchant Web page 101b to a customer or user 105. Associate processing device 102 also intercepts Web page 102b transferred from user processing device 101 to merchant processing device 103 at the point of sale. Associate processing device 102 fills in specific information 102d (such as payments, discounts, identifiers, etc.) before Web page 102b is provided to merchant processing device 103. Merchant processing device 103 is not required to generate associate-specific Web pages. User 105 does not have to fill out cumbersome codes for promotions or discounts. Commercial and marketing data is seamlessly exchanged between the parties through the proxying process.

After user 105 has logged on to associate Web site 102a, user 105 is provided with available merchants for a promotion as illustrated by FIG. 5. The available merchants can be modified to allow customization for one-to-one promotions, one-to-many promotions, many-to-one promotions, etc. User 105 clicks on a selected merchant (URL) which provides them merchant Web site 103a. Thus, associate processing device 102 serves to "proxy" all Web pages to and from merchant processing device 103. In an embodiment of the present invention, associate processing device 102 maintains a "frame" on the bottom of merchant Web page 101b to maintain consistency throughout the session. The reason for this "proxying" is to allow associate processing device 102 to automate the payment screen depending on the particular promotion. User 105 is provided with the same look and feel, and experience they would have had if they had gone directly to that merchant Web site 103a.

User 105 shops at merchant Web site 103a just as they normally would. When it comes time for payment, associate processing device 102 intercepts Web page 102b and displays it to user 105, except portions of Web page 102b are already filled out using one of the payment strategies described below. For security purposes, what is displayed may be a series of "XXX"s or redacted values. In an alternate embodiment of the present invention, the filled out portion of Web page 102b by associate processing device 102 would not be displayed to user 105.

To user 105, the online experience is exactly the same. User 105 is still interacting with merchant 106, except that the Internet traffic is first being routed through associate processing device 102.

When user 105 clicks "continue" in an effort to checkout, associate processing device 102 leverages the merchant's 106 payment mechanism. This minimizes merchant's 106 efforts to understand and accommodate a new form of payment. In an embodiment of the present invention, associate processing device 102 converts a unique SoftCoin™ card number to promotional information or a key 102d used in payment for merchants' merchandise. In an embodiment, key 102d is a unique alphanumeric string of characters. In an embodiment, key 102d is a SoftCoin™ Payment System (SPS) which may be a: gift certificate, promotion number or code, credit card, URL, or any other form of payment acceptable to merchant 106.

In an embodiment, card numbers are delivered to user 105 in the form of electronic certificates through online networks of personal computers, TV or other devices with video monitors, telephones, wireless devices, video game consoles and appliances.

FIG. 1(*a*) illustrates the use of key 102d by associate processing device 102 according to an embodiment of the present invention. Associate processing device 102 uses the existing merchant 103 payment mechanisms to automate payment. Merchant 106, or multiple merchants, provides associate 107 with a quantity of valid gift certificate numbers or other promotional codes, credit card numbers or any other information relating to a payment system. Associate 107 creates an association in merchant database 580, shown in FIG. 1(*b*), between valid associate card numbers (which will be generated prior to any promotion and provided to associate 107), and the keys or SPSs 102d for the multiple merchants participating in the promotion. User 105 activates SoftCoin™ card 109 and then begins shopping at a selected merchant Web site. Associate processing device 102 intercepts a merchant Web page having purchase information 102c and automates the insertion of a "code" or key 102d into the SPS block on payment Web page 102b. When Web page 102b is actually sent, key 102d is sent to merchant processing device 103. At this point, the associate processing device 102 debits this amount from an associate account. Associate processing device 102 clears its transactions by verifying whether an order confirmation number is shown to user 105. All shipping details are handled normally through merchant 106, as are credit card details for amounts above a SPS amount.

In a preferred embodiment, refunds are not available, following the same policy for SPS numbers, or if so, only through whatever policy merchant 106 already has in place. In an alternate embodiment, associate 107 will not provide a refund to an associate account.

FIG. 1(*b*) illustrates an embodiment of the present invention in which computers are used with the Internet. For example, user computer 300 is coupled to associate server 500 and merchant server 600 through Internet 400. User 105 utilizes a Web browser 310 running on a user computer 300 that can access hypertext documents stored on an associate server computer 500 located on a computer network, such as Internet 400. A Web page 330 presented to user 105 may include a form 314 where user 105 can enter one or more of merchandise, catalog number, name, address and other identifying information, payment information, an opt-in method to obtain consumer consent for permission-based marketing and other demographic information as part of an online commercial transaction. In an embodiment, a form 314 is provided from merchant Web server 600 by way of associate server 500. Likewise, graphic images 312 from merchant server 600 may enhance the activation, registration and shopping experience of user 105. In an embodiment, associate server 500 may filter graphic images 312.

Server 500 employs a three-tiered server architecture: Web page server 510, proxy server 520, and purchasing server 530. The three servers may reside in one or more computers linked by a local area network (LAN) or a wide area network (WAN). Web page server 510, running HTTP server software, transfers a hypertext document to user computer 300 for display on browser 310. In FIG. 1(*b*), Servers 500, 510, 520 and 530 illustrate the software and hardware to carry out an embodiment of the present invention.

In an embodiment of the present invention, software illustrated by FIGS. 1(*a*)-(*d*) is stored in an article of manufacture, such as a computer readable medium. For example, associate proxy software may be stored in a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

An online transaction may be linked to user-specific information, which may be stored in a user database 540. Information obtained and stored in user database 540 can be used to generate reports of user profiles as well as specific identifying or payment information (such as credit card numbers) to facilitate later use of an online transaction by user 105. In an embodiment of the present invention, a username-passcode combination is set up by user 105 to facilitate and speed up the activation process during future visits to associate Web site 102*a*.

In an embodiment, a cookie processing software program (not shown) is also included in associate server 500. Information pertaining to a particular user is stored in user computer 300 by a standard mechanism known as "cookies." Information stored as cookies 320 may include a user's identification and demographic information as well as name, address, and payment information. While cookie 320 is stored on user computer 300, the purchasing program server 530 handles writing of cookie 320 and recording and retrieving data from cookie 320.

A user 105 may register at the associate Web site 102*a* to visit one or more merchants designated by associate 107 in order to make online purchases. In one embodiment, user 105 may shop at an online merchant's site where merchant Web page 610 is delivered to user computer 300 via associate server 500. In this embodiment, the entire shopping experience is routed through associate server 500. When a user decides to shop at a particular merchant site from a list presented on browser 310 by associate server 500, user 105 requests a Web page 610 from merchant Web server 600. The request is routed through associate server 500 and proxy program server 520 receives the merchant Web page 610 en route to user computer 300. Proxy program server 520 presents a proxied version of Web page 610 to user 105. The proxied Web page 330 includes the entire content of the merchant Web page 610. By receiving identical graphics 312, forms 314 and text as presented on the merchant Web page 610, user 105 is not denied any features of the shopping experience. In an embodiment, proxy program server 520 adds a frame or other identifying feature in or around the merchant Web page 610 in order to notify user 105 of the proxy process and to maintain a uniform online shopping experience. In an embodiment, a frame in a proxied Web page 330 is added by HTML code, javascript or any like method.

Proxy program server 520 monitors the online shopping activity of user 105 and dynamically enters appropriate discounts and other values based on the online transaction and associate's 107 marketing relationship with merchant 106. Promotion-related information and programs may be stored in a merchant database 560 and included in a user 105 response directed to merchant server 600 as user 105 proceeds with an online purchase at a merchant Web site. For example, in a gift certificate redemption program, a merchant 106 may provide a set of codes to associate 107 related to gift certificates. The codes are stored in a merchant database 560. When a user 105 redeems the gift certificate, the proxy program server 520 intercepts the payment page and automates the insertion of the "code" into the gift certificate block on the Web page.

In an alternate embodiment, some of the entered information may be included in the transmission without user 105 being aware of the entered information. Such information may include, but is not limited to, tags identifying associate 107, which directed the sale to merchant 106, commissions and gathered user demographic data generated from the sale. By channeling the viewing of the merchant Web site 103*a* through associate server 500 and monitoring and entering the redemption information dynamically, server 500 dramatically enhances the online transaction process by avoiding the cumbersome and burdensome entry of promotion redemption codes by user 105. Merchant 106 is also benefited because it does not have to generate unique website for every associate 107.

The functions of purchasing program server 530 may include storing user information in a user database 540, activating promotional material, clearing transactions, tracking and reporting and maintaining system security. In an embodiment, a product database 550 may be included to maintain merchandise profiles of inventory, promotions and sales.

In an embodiment, a merchant 106 pays a fee or commission to associate 107 when an online transaction is successfully accomplished.

II. Associate Proxy Shopping/Payment Method

In an embodiment of the present invention, merchant 106 provides associate 107 with a quantity of SPS numbers associated with a promotion. Associate 107 stores SPS numbers in merchant database 560.

In a first embodiment of the present invention, a "pool" of valid merchant SPS numbers is used. When a user wants to shop at a particular merchant, one of these valid SPS numbers is pulled and a value associated with the SPS number is used. This will allow easy tracking of used/unused SPS numbers.

In a second embodiment of the present invention, a merchant provides a single SPS number for all users. This SPS number will have a large initial balance, which is deducted and tracked for each different user.

In an embodiment of the present invention, costs, such as tax and shipping/handling, are recorded for each SPS number. In an alternate embodiment, a value associated with the SPS number covers a portion of product price, tax, and shipping/handling, whereas other promotions will require the value to cover only the product.

FIGS. 1(*c*)-(*d*) illustrate a method 200 for facilitating a transaction between a customer/user 105, associate 107 and merchant 106 according to an embodiment of the present invention. As one who is skilled in the art would appreciate, FIGS. 1(*c*)-(*d*) illustrates logic boxes or steps for performing specific functions. In alternate embodiments, more or fewer logic boxes or steps are used. In an embodiment of the present invention, a logic box or step may represent a software program, a software object, a software function, a software subroutine, a software method, a software instance, a code fragment, a hardware operation or user operation, singly or in combination.

Method 200 starts by a user 105 obtaining a card 109 having a user identification value and pass code as illustrated in logic block 201. As described in detail below, user 105 activates card 109 by transferring a user identification value and pass code to associate processing device 201 as illustrated in logic block 202.

In logic block 203, a single or a plurality of merchant Web site addresses or hyperlinks are provided from associate processing device 102 to user processing device 101. The merchant Web site addresses are provided based upon the promotion related to card 109. User 105 then "clicks" on the selected merchant Web site address or hyperlink.

User 105 then shops merchant Web site 103*a* as they normally would as illustrated by logic block 204. Information regarding a product or products is provided to user processing device 101 via associate processing device 102. An associate frame or information is provided at the bottom of the merchant Web pages in an embodiment of the present invention. In an alternate embodiment, the frame is not provided.

At this point, since associate processing device 102 is intercepting each Web page being passed back from merchant processing device 103, associate processing device 102 tracks and records: 1) site Navigation patterns (time spent on each page, how many abandon shopping carts, how many pick FedEx for delivery options, etc.); 2) the User's name and shipping address; and, 3) all of the available information on what is in a shopping cart (quantity, price, etc.). In an embodiment of the present invention, this information is stored in user database 540.

As illustrated by logic block 205, user 105 selects a product or products from merchant Web site 103*a*.

User 105 then enters purchase information, such as a credit card number and shipping address, in a merchant Web page, such as a payment page, as illustrated by block 206.

In logic block 207, the purchase information is transferred to associate processing device 102.

Associate processing device 102 intercepts the payment page and inserts a SPS number into the appropriate field in the payment page, as illustrated by logic block 208. User 105 views a redacted or "XXX" SPS field of the payment page.

At this point, associate processing device 102 debits a value from the purchase price associated with the SPS number and updates the potential value of the SPS numbers for merchant 106. For example, two merchants, Online Merchant No. 1 and Online Merchant No. 2, are associated with a promotion. The total associate face value associated with this promotion is $10. If a User spends the $10 at Online Merchant No. 1, once this transaction is completed, this $10 associate face value is debited from their associate balance. In an embodiment, all shipping details are handled normally, as are credit card details for amounts above the SPS amount. Associate 107 does not have to clear any credit card transactions, nor assume the liability of having to provide its own credit for the value of the merchandise.

Associate processing device 102 also records breakage amounts. Breakage amounts are defined, as the amount "leftover" if a product purchased online is less than the value associated with a SPS number. In other words, if the face value of an associate card 109 is $10 and user 105 spends only $7, the remaining $3 is referred to as a breakage amount when card 109 has expired.

In an embodiment, associate 107 will charge merchant 106 a transaction fee based on either: 1) transaction percentage based on the total amount of the transaction; 2) one transaction percentage for the associate face value corresponding to card 109 and another transaction percentages for the amount over an associate face value that was spent; or, 3) transaction percentage based only on an associate face value. The purchase information and promotional information is transferred from associate processing device 102 to merchant processing device 103.

In an alternate embodiment, associate 107 requires all users to include personal credit card information up front in the event that their spending goes over an associate card value. Thus, a user session may be easier upon checkout, not forcing them to have to go through the extra step of giving their credit card details.

Finally, the purchase information and promotional information is transferred to merchant processing device 103 as illustrated in logic block 209.

In an embodiment, United States currency is used. In alternate embodiments, other currency may be used.

Users seeking to validate their associate cards for usage on Internet merchant sites will access a public section of associate Web site 102*a*. In an embodiment of the present invention, a brief demo is provided at the public section of associate Web site 102*a*.

In an embodiment, both offline promoters and online merchants access associate Web site 102*a* to obtain statistical promotional information (such as redemption rates, percent spent where online, etc.) in near real-time via a secure Internet connection.

III. Login Functionality

Login functions available to user 105 visiting an associate Web site 102*a* is described below.

A. A user has not been to an associate Web site before and activates a new associate card and creates a new associate account.

Figure 2:
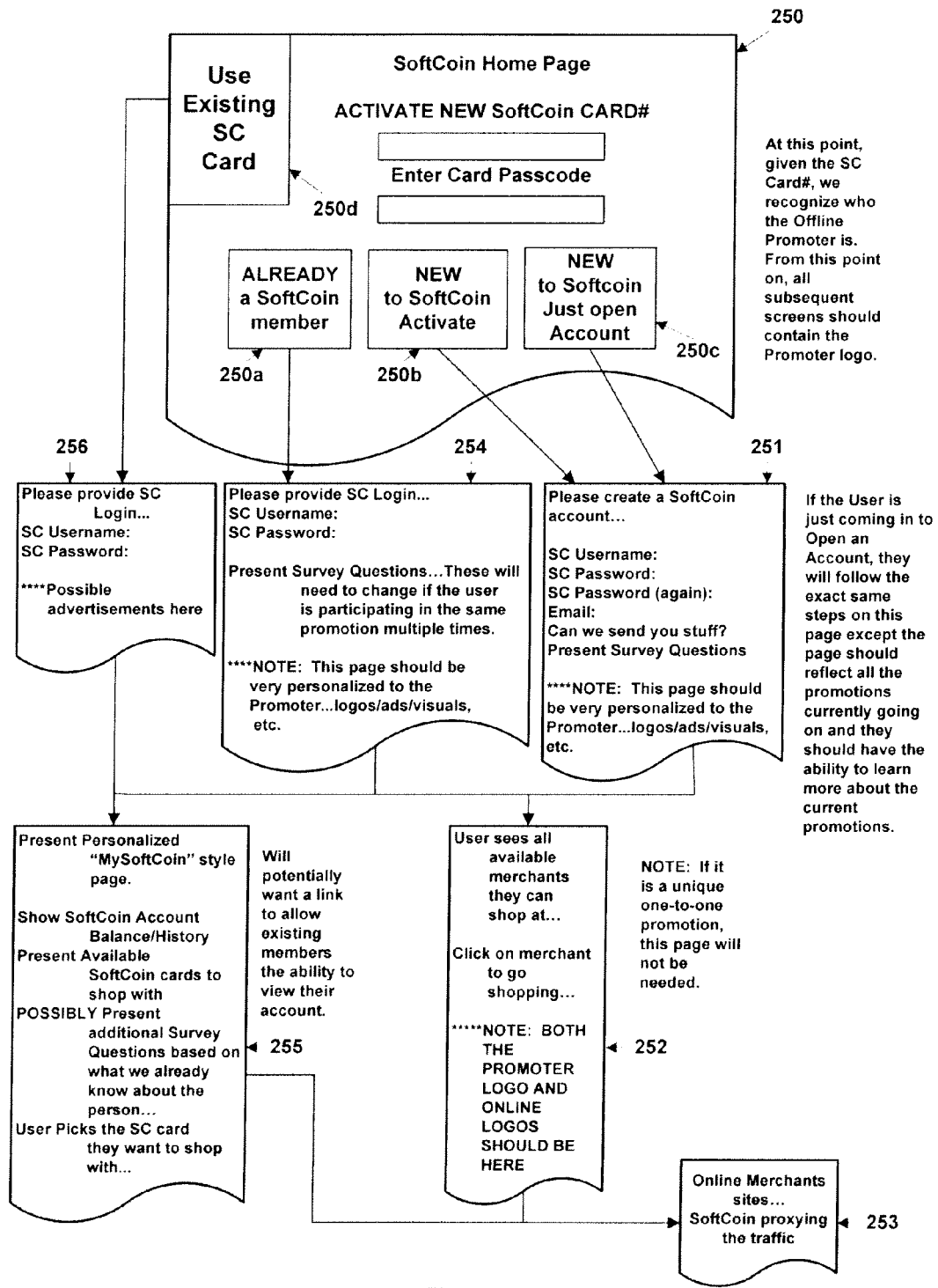
FIG. 2 illustrates information provided to a user of an associate Web site according to an embodiment of the present invention.

In an embodiment of the present invention, FIG. 2 illustrates screen shots available to user 105 accessing an associate Web site 102*a*. The initial screen 250 will allow user 105 to input an associate card number and pass code and press a "New to SoftCoin" button 250*b*. In an alternate embodiment, screen shots are branded with offline promoter information. For example, SoftCoin™ is replaced with Kodak and Kodak graphics are added.

The initial screen 250 is for a user 105 to input their associate card number with the corresponding password/pass code that is written on associate card 109. Associate server 500 verifies that a valid associate card has been entered. By adding the additional pass code, a second layer of security and integrity is provided.

Associate server 500 also tracks an incoming IP Address of user 105 activating card 109. If server 500 notices that the same user/IP address has unsuccessfully attempted to activate 5 times, that IP address can be recorded and blocked for a given time period. This will allow associate server 500 to prevent having a random number generator constantly sending associate server 500 possible security code numbers and pass codes. If associate server 500 detects that a security breach was attempted, an email can alert the associate technical staff.

After successful verification of an associate card 109, screen 251 will be provided to user 105. The visual layout of screen 251 is promoter-centric. Screen 251 highlights and reinforces the brand of a promoter/merchant that user 105 recognizes. User 251 is asked to create an anonymous account in screen 251. User 251 creates a unique associate username, associate password, and inputs an email address. In an embodiment, screen 251 asks if user 105 minds receiving periodic newsletters, emails, promotions to their email address. In an embodiment, screen 251 provides a variable list of closed ended survey questions. These survey questions are selected based on the particular promotion associated with card 109. At this point, user 105 clicks to continue onto screen 252.

Figure 3:
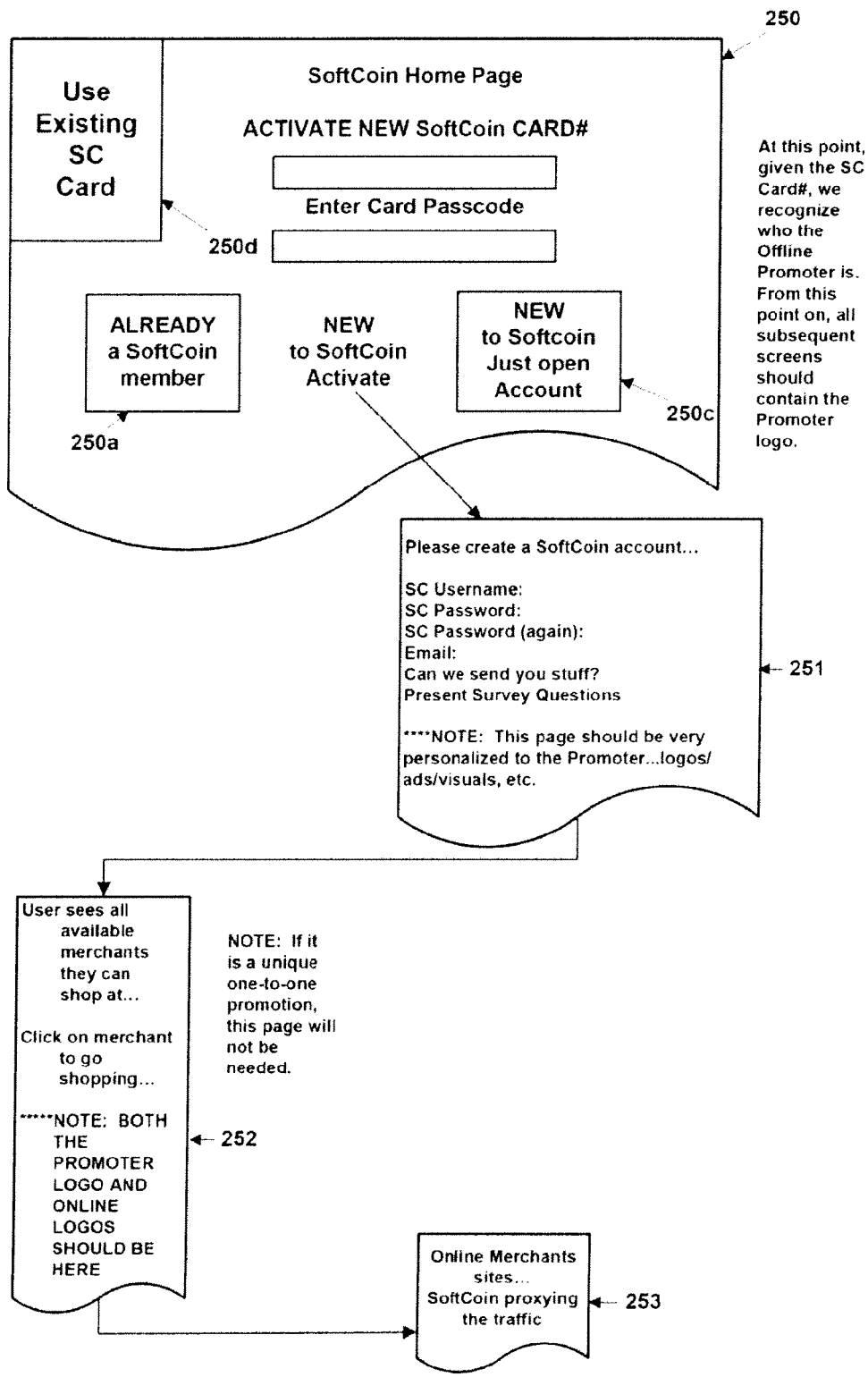
FIG. 3 illustrates information provided to a first time user activating a new card and a new associate account according to an embodiment of the present invention.

Screen 252 displays all the available merchants that user 105 can now use to shop with an associate card 109. Screen 252 reinforces the brand of a promoter along with the various merchants that are available choices to user 105. FIG. 3 illustrates screens 250, 251 and 252 and user 105 provided with a selected merchant site as illustrated by logic block 253.

B. A user has an associate account and needs to activate a new card.

A user 105, with an associate account, can access an associate Web site to activate card 109. The initial screen 250, as illustrated in FIG. 2, will allow user 105 to input an associate card number and pass code and press an "ALREADY a SoftCoin member" button 250*a*.

The initial screen 250 is for a user 105 to input their associate card number with the corresponding password/pass code that is written on associate card 109. Associate server 500 verifies that a valid associate card has been entered. By adding the additional pass code, a second layer of security and integrity is provided.

Associate server 500 also tracks an incoming IP Address of user 105 activating card 109. If server 500 notices that the same user/IP address has unsuccessfully attempted to activate 5 times, that IP address can be recorded and blocked for a given time period. This will allow associate server 500 to prevent having a random number generator constantly sending associate server 500 possible security code numbers and pass codes. If associate server 500 detects that a security breach was attempted, an email alerts members of the associate technical staff.

After successful verification of an associate card 109, screen 251 will be provided to user 105. The visual layout of screen 254 is promoter-centric. Screen 254 highlights and reinforces the brand of a promoter/merchant that user 105 recognizes. On screen 254, since user 105 will have already been to associate Web site 102a before and created an associate account, user 105 is asked for an associate username and associate password. Since we know user 105 has been to associate Web site 102a before, user 105 may have already participated in a particular promotion. In this situation, associate server 500 recognizes that user 105 has already participated in this particular promotion, and has already answered the initial sets of survey questions. In this case, a new set of more detailed survey questions may be asked as illustrated in screen 255 of FIG. 4. At this point, user 105 clicks to continue onto screen 252.

Screen 252 displays all the available merchants that user 105 can now use an associate card 109 to go shop on. Screen 252 reinforces the brand of a promoter along with the various merchants that are available choices to user 105.

Figure 4:
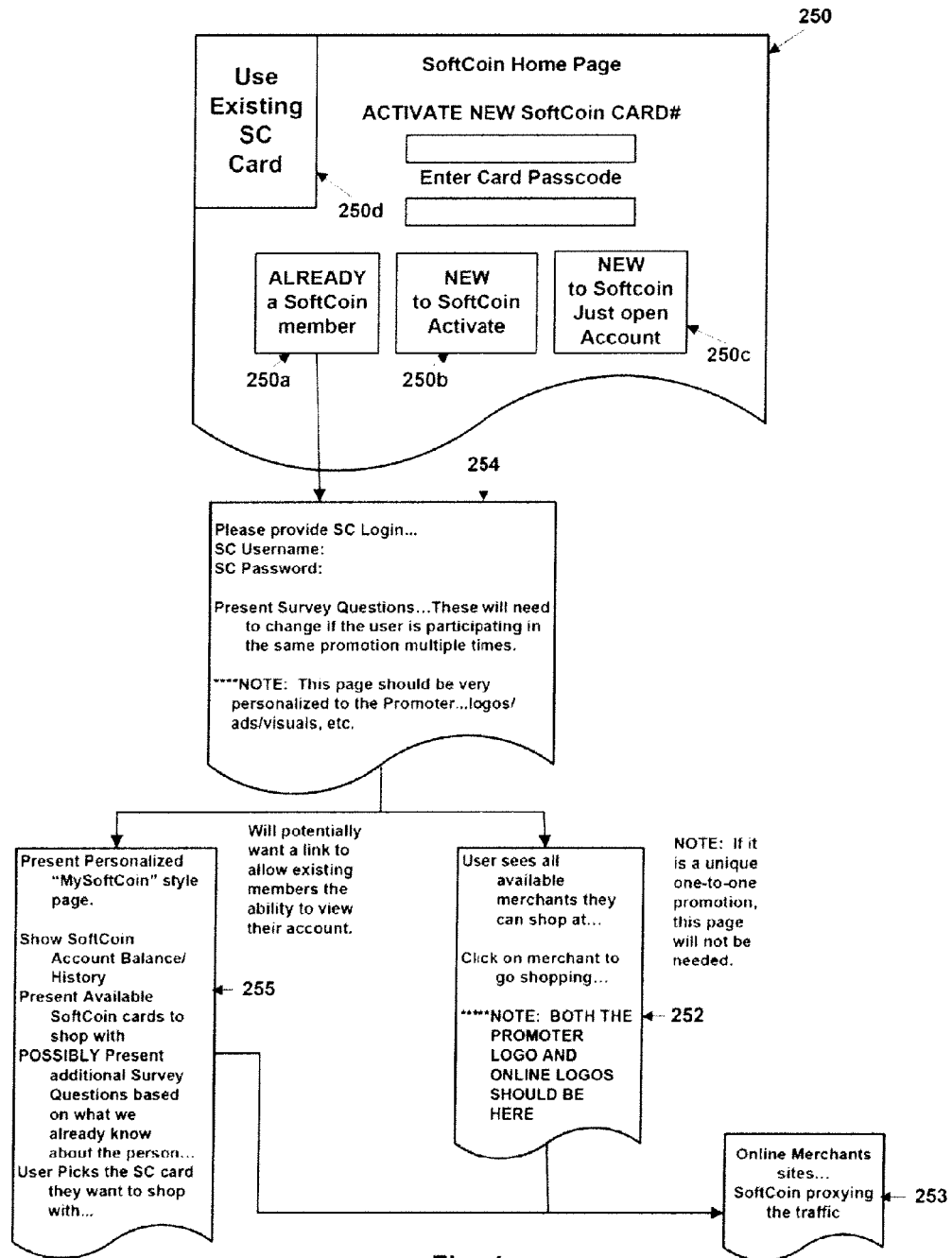
FIG. 4 illustrates information provided to an associate account user activating a new associate promotion card according to an embodiment of the present invention.

FIG. 4 illustrates screens 250, 252, 254, 255 and user 105 provided with a selected merchant site as illustrated by logic block 253.

C. A User has an Associate Account, and is Returning to Shop on an Already Activated Associate Card. Alternatively, a User "Views" an Account.

In this case, a user 105 has an associate user account and has activated an associate card 109. User 105 wants to continue shopping based on this original associate card 109. Screen 250, illustrated in FIGS. 2 and 6, will provide an option to bypass having to enter a new associate card number, but rather allowing user 105 to press "Use an Existing Associate card or View Account" button 250d. The User will click button 250d and screen 256 will be provided.

Screen 256 will ask for the user's associate username/password. In an embodiment of the present invention, screen 256 has advertisements. User 105 is authenticated and screen 257 is provided.

Screen 257 provides a personalized "My Associate" page. In an embodiment of the present invention, this page will include: 1) Associate Account Balance/Account History for any and all activated associate cards; 2) a list of which available currently activated associate cards user 105 can pick from to shop with; 3) survey questions based on what associate server 500 already knows about user 105 and their shopping patterns; 4) an easy to understand table similar to the one shown in FIG. 5.

Screen 257 provides user 105 with a detailed breakdown of the different activated associate cards and the corresponding promotion. By viewing this, user 105 can now click on the icon of a merchant they want to shop at and this will launch them into their shopping experience.

In an embodiment of the present invention, associate server 500 can automate an email reminder to a user 105 at least one week before a promotion is to expire in order to encourage user 105 to return to associate Web site 102a to finish shopping.

Figure 6:
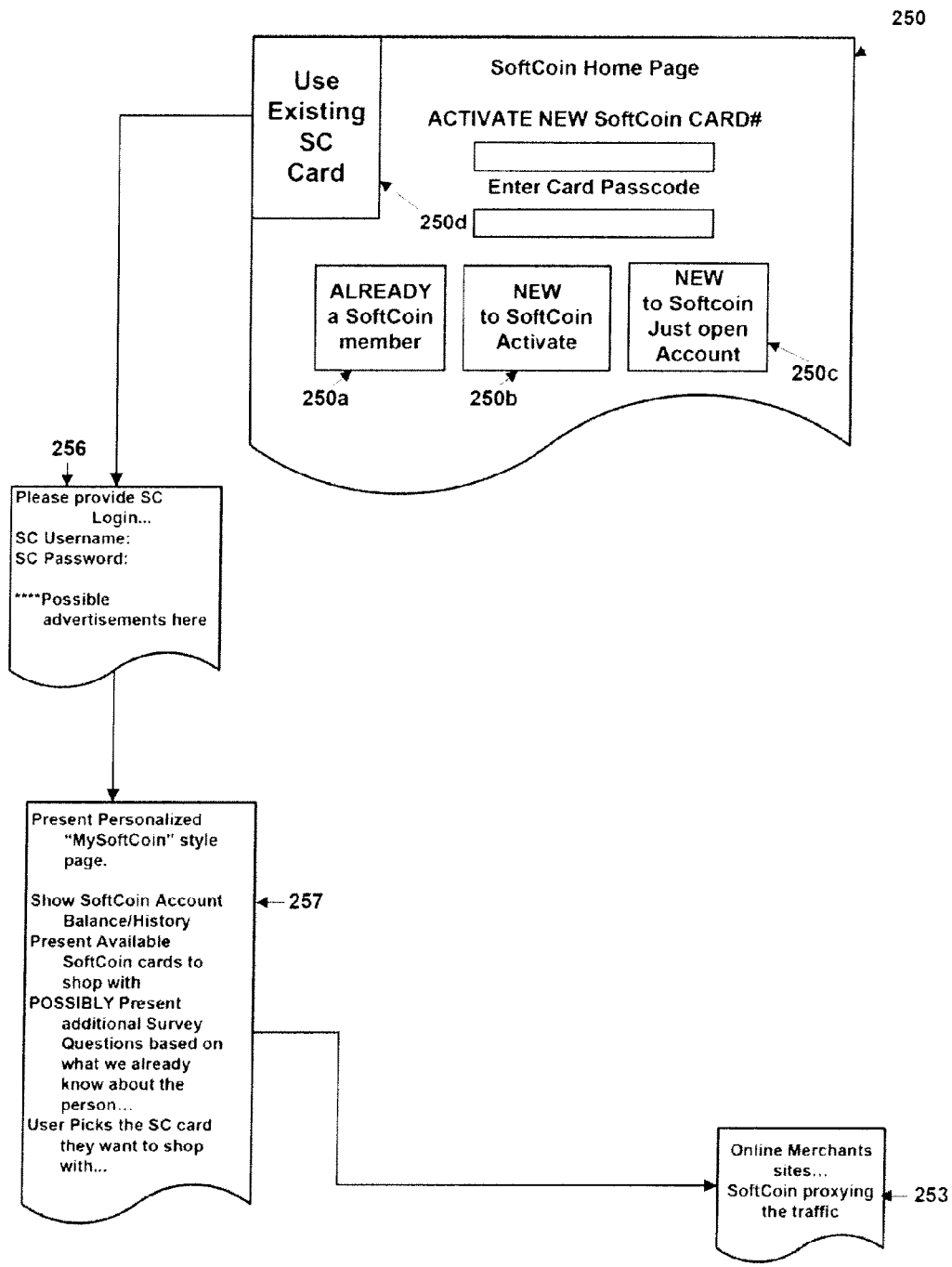
FIG. 6 illustrates information provided to an existing associate user who has activated at least one associate promotion card according to an embodiment of the present invention.

FIG. 6 illustrates screens 250, 256, 257 and user 105 provided with a selected merchant site as illustrated by logic block 253.

D. User Opens an Associate Account in Order to be Notified of Future Promotions Even if they have No Card to Activate.

This is the case for a user who is using associate Web site 102a for the first time, not for a specific promotion, but simply wants to sign up and be notified of future promotions. Screen 250, illustrated in FIGS. 2 and 7, allows user 105 to press "NEW to SoftCoin just open Account" button 250c. In an embodiment, button 250c is omitted and button 250b is used for the functions associated with button 250c.

Figure 7:
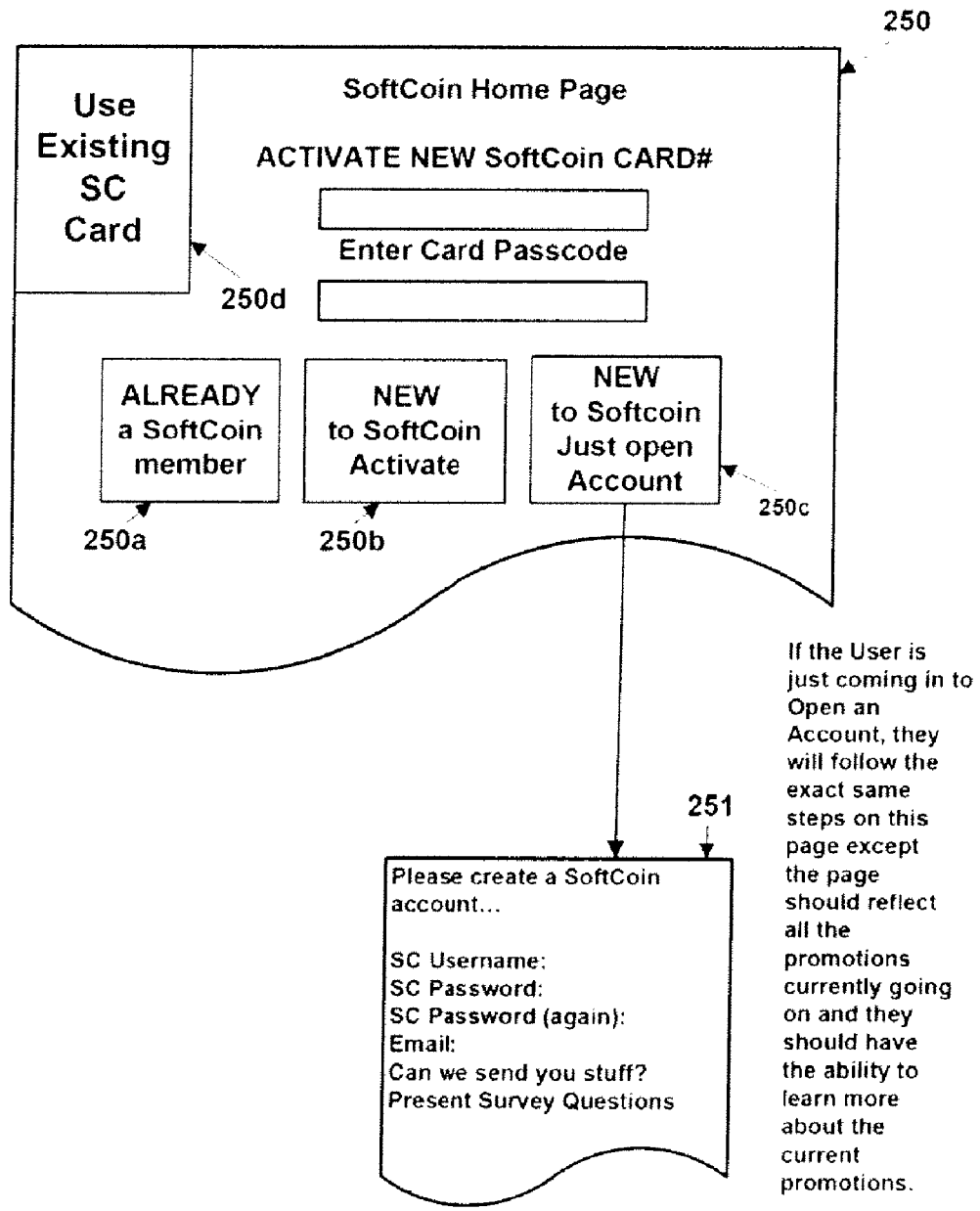
FIG. 7 illustrates information provided to an associate account user who wants to be notified of future promotions according to an embodiment of the present invention.

Screen 251 provides the various promotions ongoing at that time (for example, if Offline Merchant No. 1 and Offline Merchant No. 2 are having currently having promotions with Online Merchant No. 1 and Online Merchant No. 2, these logos and details can be clearly identified. This way the new users can know that if they go out and buy some Offline Merchant No. 1 product that they will get an associate card). Screen 251 highlights and reinforces the brands of the promotions that an associate is currently executing. On screen 251, user 105 is asked to create an anonymous account. Thus, user 105 is only required to create a unique associate username and associate password, and input an email address. Additionally, user 105 is asked if they mind receiving periodic newsletters, emails, and promotions to their email address. In an embodiment of the present invention, screen 251 provides a variable list of closed ended survey questions. These survey questions are selected based on a particular promotion. At this point, user 105 can return to the home page or select on one of the current promotions to learn more about it as illustrated in FIG. 7.

IV. Other Functions

Several other considerations may be accounted for in implementing system 100. In alternate embodiments, system 100 provides the following functions, singly or in combination.

A. Forgotten Passwords.

There is functionality to retrieve a lost password. A user's email is used to retrieve a password.

B. The Activation of an Associate Card.

The interface is as clean as possible and makes it very easy for the user 105 to get started quickly.

C. An Associate has the Ability to Allow or not Allow the Same User to Redeem Multiple Promotion Cards from the Same Promotion.

In an embodiment of the present invention for all promotions, associate server 500 allows a single user the ability to activate one and only one card per promotion or allow the user to activate multiple cards for a particular promotion. Online Merchants are willing to "pay" to obtain a new user, but some may not be willing to pay for an existing user.

D. Card Consolidation.

Users accumulate multiple associate cards, consolidate their total at an associate Web site 102a, and then pass this total amount as their available Associate balance. In an embodiment, this is only done to allow multiple cards from the same promotion to be consolidated.

a. Card Aggregation Incentive.

Users accumulate multiple associate cards in order to redeem a single fixed amount. This is different than Card Consolidation above because this aggregation is based on an incentive to a user 105 to buy more offline products. For example, Offline Merchant No. 3 may require a user 105 to obtain 3 associate cards (by purchasing 3 separate items) and after they have collected 3 associate cards, these can now be entered into an associate Web site 102*a* and a user 105 will now have a fixed amount to spend online. Note, that in this function, user 105 cannot redeem anything if they only have a single associate card, or two associate cards. This function becomes activated with 3 associate cards.

b. Ability to Offer a Loyalty-Rewards Style Capability to Add Additional Money to an Associate Card or Account.

In an effort to provide incentives to users to give an associate Web site 102*a* as much possible information about their buying habits/patterns, personal information, etc., associate Web site 102*a* may offer user 105 more money to spend if they are willing to participate in longer survey questionnaires. In an embodiment, periodic emails are sent to the users or an option is provided before users go shopping which says "Want to double your associate money before shopping?" When user 105 clicks on this option they are presented a longer set of survey questions (15-20) that is based on what we already know about user 105. Once user 105 completes this, they now have more money on their associate card.

c. Associate Cards Must have the Ability to Maintain a Relationship with a Unique Identifier by an Offline Promoter.

An Offline Promoter may have a tracking number. Associate Web site 102*a* links this number to an associate card number in user database 540. This association is important because it will allow associate Web site 102*a* to know the distribution regions of associate cards based on the regional/store information listed on the product tracking number. This allows associate Web site 102*a* the ability to offer more customized survey question to users based on where they live. For example, if Offline Merchant No. 1 puts details on its tracking number as to what city and store is selling products of Offline Merchant No. 1, associate server 500 create a one-to-one association between that Offline Merchant No. 1 tracking number and the Associate number that is printed on that Offline Merchant No. 1 product. This way, when that particular Offline Merchant No. 1 associated associate card is activated, associate Web site 102*a* will know exactly where it was purchased and ask more specific survey questions. (E.g., Offline Merchant No. 1 may want to ask California resident's different questions than Florida residents.)

In an embodiment, an associate account table must reference all associate card numbers activated in order to track promotions users are coming to associate on.

An associate account table should reference an Account-History table to track all the online purchases a user is likely to make. In an embodiment, time/date/item purchased/number/amount/payment method/online vendor/online transaction ID is recorded. This information can potentially be used as a means to prevent users from redeeming multiple associate cards within a given promotion if this is not allowed.

D. Users Initiate Associate Login from a Promoter's Web Site.

In an embodiment of the present invention, if Offline Merchant No. 1 is involved in a promotion, in an effort to reinforce their brand, they may want to have user 105 actually go to the Offline Merchant No. 1's Website first. From this Website, they will initiate the associate login/activation.

E. Offline Promoters are Responsible for Payment to an Associate Upon Card Activation (or within Some Brief Time Interval Thereafter).

Online Merchants are responsible for payment to an associate 107 upon card 109 redemption (or within some brief time interval thereafter). Thus, associate server 500 provides daily reports on the total number of outstanding and activated cards for all promotions.

V. Promoters (Offline Brands)

In an embodiment of the present invention, promoters promote brands through the Internet by inserting cards with a listed face value into their product packages, or through distributing these cards through other feasible ways (such as email/direct mail). System 100 enables a promoter to use online merchants through an engaging Internet site.

In an embodiment of the present invention, promoters are provided daily, weekly and quarterly reports on the total number of activated cards, and a breakdown of where a user spent online, for a given promotion. Associate processing device 102 calculates the number of activated cards multiplied by the activation fee per card to indicate the amount receivable from a promoter.

In an alternate embodiment, a promoter can view from associate Web site 102*a*: 1) number of cards in circulation; 2) number of cards activated; and 3) number of cards redeemed at a specific online merchant Web site.

VI. Merchants (Online Brands)

Merchants will have similar access to associate Web site 102*a*.

In an embodiment of the present invention, merchants are provided daily, weekly and quarterly reports on the total number of utilized cards for a particular promotion. Associate processing device 102 calculates the number of utilized cards multiplied by the activation fee per card to indicate the amount receivable from the merchant.

In an alternate embodiment, a merchant can view from associate Web site 102*a*: 1) number of cards in circulation; 2) number of cards activated; and 3) number of cards redeemed at a specific online merchant Web site.

VII. Conclusion

Any number of business objectives may be met by this system including marketing, advertising, volume, trial, loyalty, distribution, and strategic or any other business objective. The flexibility of the system allows cross-promotions between online and offline merchants may be structured as single offline to single online, single offline to multiple online, online to online or any other combination including online to offline.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method comprising:
   receiving, at an associate processing device operated by an associate business entity, a request from an individual for payment of at least one product or service offered by a merchant;

accessing, by the associate processing device, an account associated with the individual, wherein the account is configured to store data pertaining to a plurality of associate cards, and wherein the account comprises an account value provided by the associate business entity corresponding to an amount of associate card data that the individual has stored in the account;

receiving, at the associate processing device, data that is provided by the individual and associated with an associate card, wherein the received data is used to identify a value of the associate card and to identify a distribution region for the associate card;

recording, in the account by the associate processing device, the received data associated with the associate card;

recording, by the associate processing device, the distribution region for the associate card according to the received associate card data;

incrementing, by the associate processing device, the account value according to the received associate card data; and in response to the account value equaling a threshold value, enabling fulfillment of the request.

2. The method of claim 1, wherein receiving the request for payment of at least one product or service comprises receiving the request via a selection of an electronic medium corresponding to the product or service, the electronic medium comprising one or more of the following:
a URL address; and
a hyperlink to a corresponding webpage.

3. The method of claim 1, wherein accessing an account comprises:
accessing previously transmitted instructions from the individual, wherein the instructions identify the individual; and
using the instructions to access the account associated with the individual.

4. The method of claim 1, wherein the associate card is associated with one or more of the following:
an online merchant; and
an offline merchant.

5. The method of claim 1, further comprising:
transmitting one or more instructions to the individual; and
using the one or more transmitted instructions to electronically identify the individual.

6. The method of claim 5, wherein the one or more transmitted instructions comprise a cookie.

7. The method of claim 1, wherein the received data associated with the associate card comprises data indicative of where a product or service associated with the associate card was purchased.

8. The method of claim 7, wherein the data indicative of where a product or service associated with the associate card was purchased comprises a tracking number.

9. The method of claim 1, further comprising:
presenting the individual with one or more survey questions, wherein the survey questions inquire about one or more of the individual's buying habits, buying patterns and personal information; and
if a response to each survey question is received, providing the individual with a second incentive.

10. The method of claim 9, wherein presenting the individual with one or more survey questions comprises sending the individual an email comprising a link to the one or more survey questions.

11. A system of encouraging an individual to purchase a product or service, the system comprising:
an associate processing device operated by an associate business entity; and
a computer-readable storage medium in communication with the associate processing device, wherein the computer-readable storage medium comprises one or more programming instructions that, when executed:
receive a request from the individual for payment of at least one product or service offered by a merchant,
access an account associated with the individual, wherein the account is configured to store data pertaining to a plurality of associate cards, wherein the account comprises an account value provided by the associate business entity corresponding to an amount of associate card data that the individual has presented to the associate processing device for storage in the account,
receive, from the individual, data associated with an associate card, wherein the received data is used to identify a value of the associate card and to identify a distribution region for the associate card,
record the received data associated with the associate card
record the distribution region for the associate card according to the received associate card data,
increment the account value according to the received associate card data, and
in response to the account value equaling a threshold value, enable fulfillment of the request.

12. The system of claim 11, wherein the one or more programming instructions that receive a request from the individual for payment of at least one product or service offered by a merchant comprise one or more programming instructions that, when executed, receive the request via a selection of an electronic medium corresponding to the product or service, wherein the electronic medium comprises one or more of the following:
a URL address; and
a hyperlink to a corresponding webpage.

13. The system of claim 11, wherein the one or more programming instructions that access an account associated with the individual comprise one or more programming instructions that, when executed:
access previously transmitted instructions from the individual, wherein the instructions identify the individual; and
use the instructions to access an account associated with the individual.

14. The system of claim 11, wherein the one or more programming instructions further comprise one or more programming instructions that, when executed:
transmit one or more instructions to the individual; and
use the one or more instructions to electronically identify the individual.

15. The system of claim 14, wherein the one or more instructions comprise a cookie.

16. The system of claim 11, wherein the one or more programming instructions further comprise one or more programming instructions that, when executed:
present the individual with one or more survey questions, wherein the survey questions inquire about one or more of the individual's buying habits, buying patterns and personal information; and
if a response to each survey question is received, provide the individual with a second incentive.

17. The system of claim 16, wherein the one or more programming instructions that present the individual with one or more survey questions comprise one or more programming instructions that, when executed, send the individual an email comprising a link to the one or more survey questions.

18. A system of encouraging an individual to purchase a product or service, the system comprising:
   an associate processing device operated by an associate business entity; and
   a computer-readable storage medium in communication with the associate processing device, wherein the computer-readable storage medium comprises one or more programming instructions that, when executed:
      receive a request from the individual for payment of at least one product or service offered by a merchant,
      access an account associated with the individual, wherein the account is configured to store data pertaining to a plurality of associate cards, wherein the account comprises an account value provided by the associate business entity corresponding to an amount of associate card data that the individual has presented to the associate processing device for storage in the account, and wherein the plurality of associate cards is not distributed by the merchant,
      receive, from the individual, data associated with an associate card, wherein the received data is used to identify a value of the associate card and to identify a distribution region for the associate card,
      record the received data associated with the associate card,
      record the distribution region for the associate card according to the received associate card data,
      increment the account value according to the received associate card data, and
      in response to the account value equaling a threshold value, enable fulfillment of the request.

19. The system of claim 18, wherein the one or more programming instructions that receive a request from the individual for payment of at least one product or service offered by a merchant comprise one or more programming instructions that, when executed, receive the request via a selection of an electronic medium corresponding to the product or service, wherein the electronic medium comprises one or more of the following:
   a URL address; and
   a hyperlink to a corresponding webpage.

20. The system of claim 18, wherein the one or more programming instructions that access an account associated with the individual comprise one or more programming instructions that, when executed:
   access previously transmitted instructions from the individual, wherein the instructions identify the individual; and
   use the instructions to access an account associated with the individual.

* * * * *